United States Patent [19]

Baxter

[11] 4,082,065
[45] Apr. 4, 1978

[54] ROTARY INTERNAL COMBUSTION ENGINE

[76] Inventor: Ernest W. Baxter, 415 E. Main St., Van Wert, Ohio 45891

[21] Appl. No.: 664,142

[22] Filed: Mar. 5, 1976

[51] Int. Cl.² ............................................. F02B 53/06
[52] U.S. Cl. .................................................... 123/219
[58] Field of Search ...................... 123/8.09, 8.11, 8.13

[56] References Cited

U.S. PATENT DOCUMENTS

| | | | |
|---|---|---|---|
| 3,762,842 | 10/1973 | George | 418/61 A |
| 3,780,707 | 12/1973 | Cole | 123/8.13 |
| 3,893,429 | 7/1975 | Jones | 123/8.13 |
| 3,915,126 | 10/1975 | Kishimoto et al. | 123/8.13 |
| 3,964,446 | 6/1976 | Kohno et al. | 123/8.13 |
| 4,003,347 | 1/1977 | Sasaki | 123/8.13 |

Primary Examiner—Carlton R. Croyle
Assistant Examiner—Michael Koczo, Jr.
Attorney, Agent, or Firm—John A. Young

[57] ABSTRACT

In a rotary engine of the "Wankel" type, an additional valve is provided for the controlled ingress of atmospheric air into the combustion chamber, permitting the engine to run at full design compression at all speeds and throttle openings, particularly idling speed, providing additional fuel economy by the addition of air, and contributing to lengthened engine life and lower air pollution by providing additional cooling of the combustion chamber and rotor.

1 Claim, 5 Drawing Figures

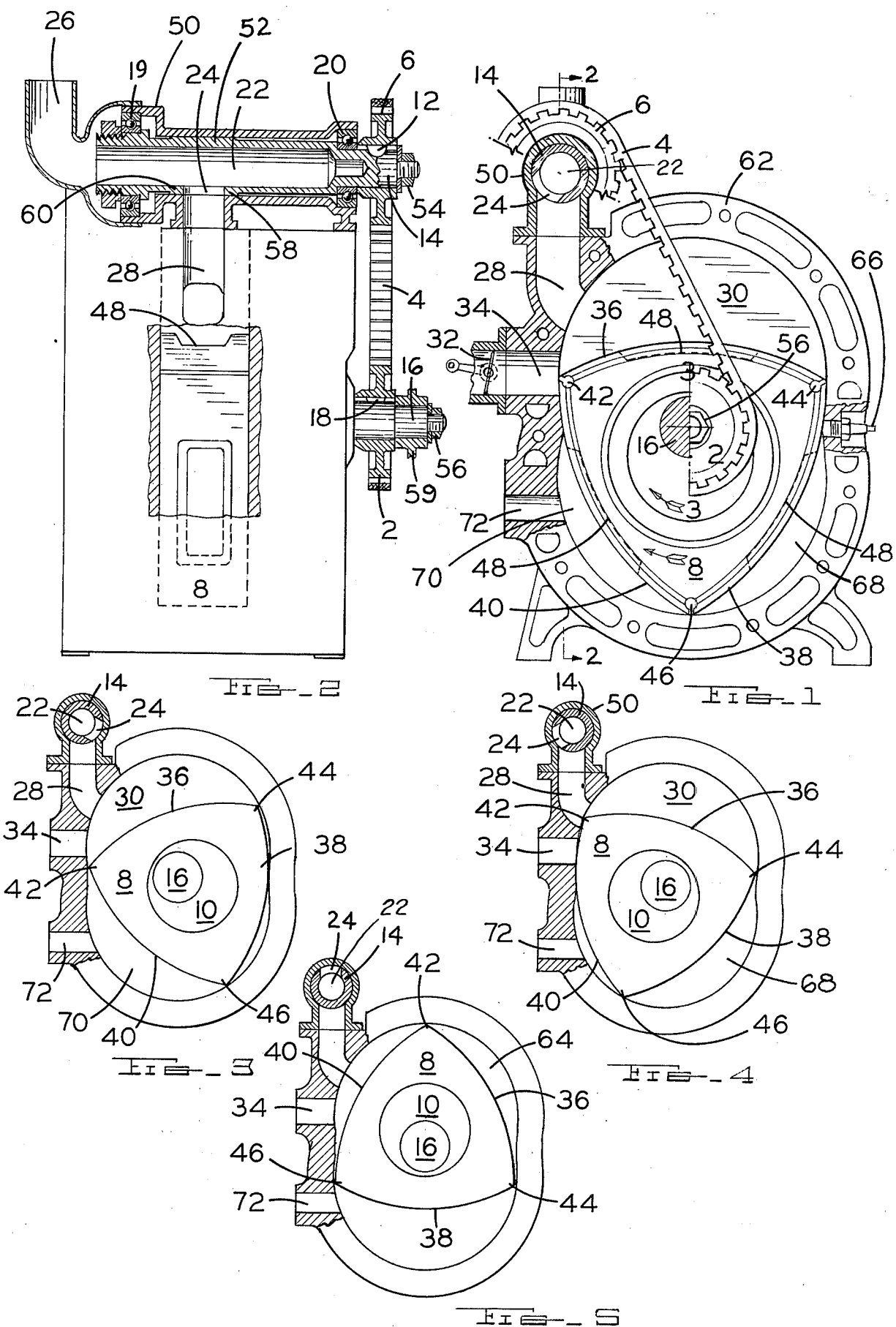

ROTARY INTERNAL COMBUSTION ENGINE

BACKGROUND OF THE INVENTION

The two most urgent needs with respect to the development of improvements in internal combustion engines during the past years have been those related to the lowering of air pollution and those relating to the need for increased fuel economy. The present invention relates to both those objectives in a manner which will be described as follows:

The Wankel engine has been of interest to the automobile producers because of its inherent simplicity, relatively light weight and relatively small size with regard to a piston engine or comparable power output. While the Wankel engine is of interest to the automotive producers because of its small size, its inherent wastefulness at speeds other than full throttle speeds has precluded the attainment of reasonable mileage values.

The Wankel engine, because of its smaller size does, however, allow the installation of anti-pollution devices under the hood in addition to the engine which could not be done with a piston engine of comparable power output since these already occupied almost the total volume under the hood of the standard automobile.

Atmospheric pollution, as it is related to the internal combustion engine, is caused principally by the emission through the exhaust of unburned hydrocarbons, carbon monoxide, and a mixture of nitrogen oxides. A number of approaches have been tried with varying degrees of success to lower these emissions.

The two goals of high efficiency which would result in good fuel economy and of low emission of pollutants are not easily obtainable in the same operating invention. An engine which operates at high efficiency will do so principally by the use of high compression ratio and operate at high temperatures but will usually result in an engine which emits a relatively large amount of nitrogen oxide, carbon monoxide and unburned hydrocarbons.

The necessity for controlling pollutants has caused drastic changes in the design of the internal combustion engine as presently manufactured in the United States. The Wankel engine originally proposed provides an alternative on the basis of its smaller size, lighter weight and simplicity in mechanical design. The initial enthusiasm for the Wankel engine in the recent past was based upon its smaller size which designers felt would enable them to add anti-pollution devices under the hood in the same space as is now used by the conventional piston engine. However, several deficiencies of the Wankel engine soon became apparent. The invention itself in operation is comparatively poor in fuel economy and passes large amounts of hydrocarbons into the atmosphere, necessitating a larger afterburner catalytic converter or other anti-pollution devices to be used. It was also found that the apex seals in the Wankel engine wear rapidly and have to be replaced after a relatively short operating life. One of the particularly unacceptable shortcomings of the Wankel engine is high fuel consumption at low speeds or idling.

The present invention seeks to alleviate both of the deficiencies by the invention of controlling the amount of air when the engine is operating at less than full throttle open, then lowering fuel consumption by allowing the idling engine to operate at a leaner mixture of fuel-air and lengthening the seal life by lowering the temperature of operation.

OBJECTS OF THE INVENTION

It is a principal object of the present invention to provide an improved Wankel engine which utilizes fuel more efficiently at idling speeds by introducing at idling speed a quantity of air which is stratified within the chamber at the time of combustion.

A further object of the invention is to achieve a cooler running engine which will contribute to longer service life of the seals and other Wankel engine components and enable greater efficiency of engine operation by virtue of such cooler running conditions.

Other objects and features of the invention will become apparent from a consideration of the following description that proceeds with reference to the accompanying drawings.

DRAWINGS

FIG. 1 is a partial sectional view of the Wankel engine;

FIG. 2 is a sectional view taken on line 2—2 of FIG. 1;

FIGS. 3, 4 and 5 are progressive views showing the inlet of air during the intake phase and prior to compression to achieve stratification of "extra" air at this phase of the engine operation.

DETAILED DESCRIPTION OF THE INVENTION

Timing belt drive wheel 2 is fastened to extended main shaft 16 by key 78 (FIG. 2). The shaft 16 drives timing belt 4 and valve wheel 6 at the rate of rotation which is three times the rate of rotation of rotor 8.

Valve wheel 6 is attached to rotary valve shaft 14 by key 12, or by other suitable means. Rotary valve 14 rotates in ball bearings 19 and 20 and has an interior passage 22 with valve port 24, rotating in valve housing 50, with close tolerance at points 52, 58 and 60, the whole forming a gas tight rotary valve assembly. Accessory drive wheel 59 is outboard of drive wheel 2 and held in place by nut 56, while rotary valve wheel 6 is held by nut 54 on rotary valve 14.

As shown in FIG. 1, 3 and 5, rotor 8 rotates clockwise and the fuel-air mixture enters the compression chamber 30 with the apex 42 at side 36 of rotor 8 approaching the carburetor inlet 34 and valve 22 starting to open. If the throttle is not fully open, as shown in FIG. 1, at this point there will be a pressure differential between chamber 30 and the atmosphere, due to the restriction of gas flow through carburetor inlet 34 by throttle valve 32 (FIG. 1). As apex 42 passes carburetor inlet 34 as shown in FIGS. 1, closing ingress of fuel-air mixture, rotary valve 22 turns to a position in which valve port 24 is aligned with air intake duct 28, allowing additional air to enter through intake 26 (FIG. 2), thence into valve chamber 22, through port 24, duct 28 and into compression chamber 30.

This additional charge of air will allow the compression chamber 30 to be fully charged with the air-fuel mixture plus additional air stratified at the trailing end of the rotor 8 and enabling the engine to run at the full design compression ratio at all speeds and throttle openings, in comparison to the operation of the unmodified engine, which obtains its full compression ratio only at low speeds at full throttle opening.

In FIG. 4, while apex 42 is just passing air intake duct 28, the valve port 24 is closing because the necessary volume of additional air has at that point entered compression chamber 30. It will be noted that by introducing the additional air later than the fuel-air mixture, a stratified charge effect is obtained, the richer portion of the fuel-air mixture being near the advancing edge of the compression chamber 30.

As the fuel-air mixture is then compressed (FIG. 5) and when the charge is fully compressed, it is fired by spark plug 66 in combustion chamber 68 (FIG. 1) which expands, driving rotor 8, and the combustion products are exhausted from exhaust lobe 70 (FIG. 3) through exhaust port 72.

The apex seals of the rotor are designated 42, 44 and 46 (FIG. 1) with the sides of the rotor designated 36, 38 and 40, each side of the rotor 8 having a hollowed depression 48.

OPERATION OF THE INVENTION

In operation, rotor 8 rotates in a clockwise direction (FIGS. 1, 3, 4 and 5) about mounting 10 on eccentric shaft 16. As the rotor turns, it defines variously compression, intake, and power chambers respectively indicated by reference numerals 68, 70 and 30.

Thus, referring to FIG. 1, the chamber 30 serves as the inlet chamber of the fuel-air mixture derived from carburetor inlet 34. Such mixture is then compressed and after compression the mixture is ignited from a spark plug 66. The expanding chamber 68 serves to power additional rotation of the rotor and the combustion products are then exhausted in the manner indicated in FIG. 4 through an exhaust port 72.

What the present invention does is to provide for additional efficiency under idling conditions by means of the valve 22 which rotates at three times the speed of the rotor under such conditions that under idling conditions, when the throttle valve 32 is restricted and there is a consequent subatmospheric pressure within the chamber 30, there will be introduced air into the chamber 30 from port 24. For the most part, incoming air will be confined as a stratified layer at the trailing end of chamber 30 and the enriched fuel-air is disposed at the leading end of the chamber 30. Thus, when the combination of gasses is then compressed to its maximum extent as indicated in FIG. 3, just prior to ignition by spark plug 66, the enriched fuel-air combination is ignited and fully burned without impairment by the stratified layer of air which contributes to the compression but without substantially detracting from the combustion conditions provided by the fuel-air ratio determined by the carburetor. Thus, power output remains at a more efficient level despite the overall leaner condition of the fuel-air ratio and the result is greater economy and efficiency of operation during idling speeds without contributing to rougher idling conditions.

The operating condition described is superimposed onto normal Wankel engine operation and is effective during idling conditions, where subatmospheric pressure subsists in 30 and causes the chamber to induct atmospheric air from inlet 26 and valve 22 through port 24 and intake duct 28 to the compression chamber 30. Under non-idling conditions, when subatmospheric pressure is and normally developed and conventional operation occurs there is no detracting from the efficiency of operation because angular movement of the rotor from the position shown in FIG. 3 to that of FIG. 4 occurs does not develop such a degree of pressure within combustion chamber 30 to cause any substantial air-fuel mixture loss in a counter or back pressure flow through intake duct 28.

It will, therefore, be seen that the particular conditions of idling wherein said atmospheric pressure occurs is automatically provided for by in-time opening of the valve 14 creating the condition of inflow of air in a stratified layer to improve conditions of compression without disturbing the combustibility of the air-fuel mixture.

The present invention is susceptible to retrofitting on existing Wankel engines and can contribute a substantial measure of improvement to engine efficiency and a greater degree of emission control. For example, because of the greater compressability of the fuel-air mixture, there is more efficient burning of the fuel and the added air causes a cooler running engine and the greater compressability makes it possible to utilize fuel more efficiently. In city driving, where the Wankel engine is at its lowest efficiency level, the present invention will contribute greatly to an upgrading of efficiency but without power loss.

Although the present invention has been illustrated and described in connection with a single example embodiment, it will be understood that this is illustrative of the invention and is by no means restrictive thereof. It is reasonably to be presumed that those skilled in this art can make numerous revisions and adaptations of the invention. It is intended that such revisions and adaptations will be included within the scope of the following claims as equivalents of the present invention.

What I claim is:

1. In a rotary internal combustion engine of the Wankel type, a three-lobed rotor having spices turning through 360°, a shaft for mounting said rotor and effecting eccentric rotation during the 360° rotation of said three-lobed rotor, a figure-8-shaped epitrochoidal chamber providing walls in which said rotor turns, the rotor apices of said rotor being in constant contact with said walls, a carburetor for the fuel supplied to said internal combustion engine and including a fuel intake port opening into said chamber to provide an air-fuel mixture which is supplied through said port opening serving as an inlet to said chamber, a carburetor valve means operative independently of said shaft to control the fuel-air flow into said chamber at an unrestricted flow rate downstream of said carburetor valve and with a flow rate and amount which is independent of the rotation of said shaft for mounting the rotor, a supplementary air intake port which is circumferentially spaced from the fuel intake port in the direction of rotation of said rotor and openable and operable independently of the throttle opening effective at said fuel intake port, a rotary control valve for controlling said supplementary air intake port and movable at a speed controlled by the speed of said shaft, means driveably interconnecting said shaft and said rotary valve whereby said rotary valve is opened and closed in timed relation to the rotation of said rotor, and whereby an additional charge of air is inducted into the chamber during the intake stage while the engine is operating at throttle openings wherein vacuum develops within said chamber, such additional charge of air being available to obviate subatmospheric pressures each time an apex of said rotor passes said carburetor and air intake ports respectively.

* * * * *